A. MARTIN.
SAW-FILING MACHINE.
No. 185,863. Patented Jan. 2, 1877.
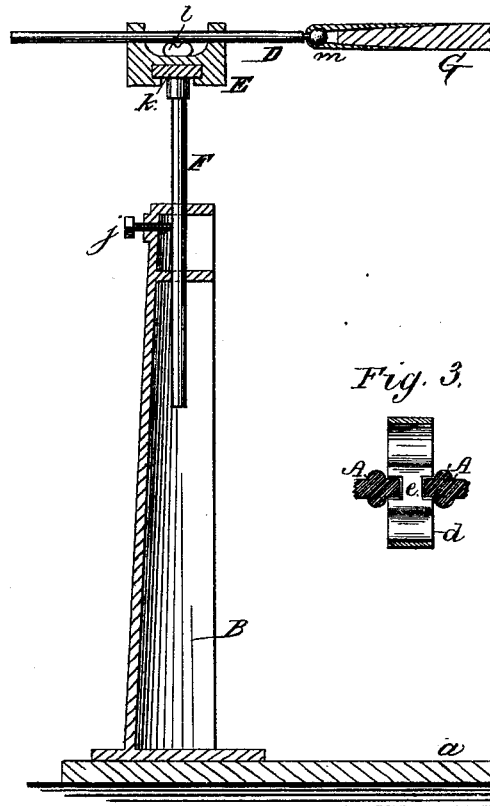
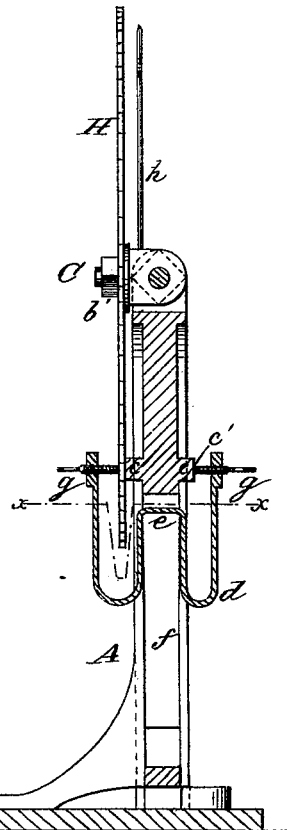
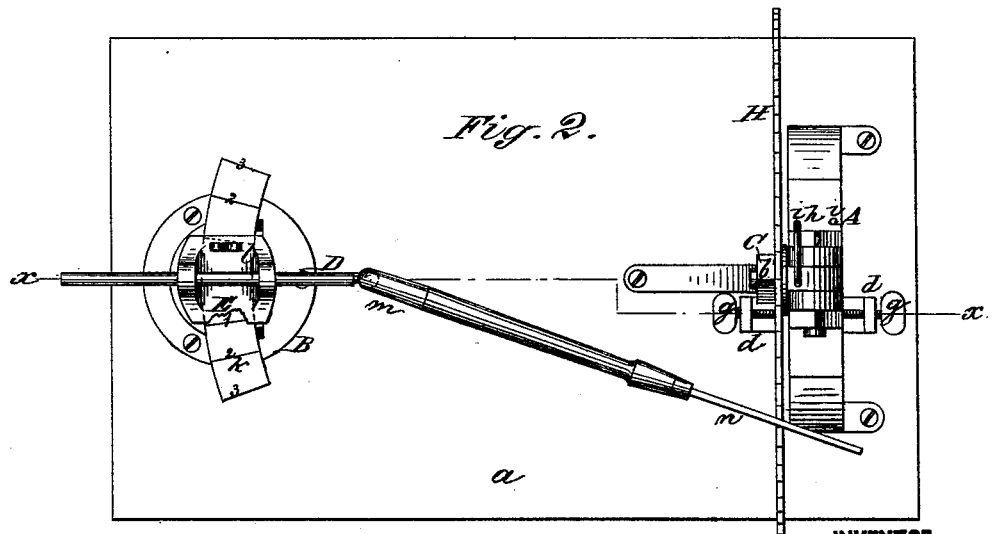
WITNESSES:
H. Rydquist
J. H. Scarborough
INVENTOR:
A. Martin
BY
ATTORNEYS.

UNITED STATES PATENT OFFICE.

ARBA MARTIN, OF BIG RAPIDS, MICHIGAN.

IMPROVEMENT IN SAW-FILING MACHINES.

Specification forming part of Letters Patent No. 185,863, dated January 2, 1877; application filed December 11, 1876.

*To all whom it may concern:*

Be it known that I, ARBA MARTIN, of Big Rapids, Mecosta county, Michigan, have invented a new and Improved Machine for Filing Saws, of which the following is a specification:

Figure 1 is a vertical section on line $x\,x$, Fig. 2, and Fig. 2 is a plan view, and Fig. 3 is a cross-section on line $x\,x$ of Fig. 1.

Similar letters of reference indicate corresponding parts.

The invention is an improvement in the class of saw-filing machines in which the file is supported and guided in a sliding or adjustable holder. The file is attached to the end of the file-handle by a ball-and-socket joint, and slides through a guide which is adjustable laterally on an arc-shaped bar. The angle of the guide and file to the face of the saw may be changed by sliding the guide on the arc-bar. The invention also consists in a peculiar arrangement of a spring, by means of which the saw is clamped while being operated upon without preventing its adjustment by application of slight force or pressure.

Referring to the drawing, A is a standard attached to a base-piece, $a$, and provided with a hinged bolt, C, upon which the saw H is secured by a nut, $b$. Lugs $c\,c'$ are formed on the standard A, against which the saw may rest. A double U-shaped spring, $d$, is cut away at its sides at $e$, and fitted to a slot, $f$, in the standard A, and is provided with thumb-screws $g$, either one of which is capable of pressing the saw against the lugs on the standard A. A gage-rod, $h$, capable of being placed in either of the holes $i$ in the standard A, projects upward from the saw-standard, and indicates the length of tooth required. It is offset near its upper end, so that it may be turned out of the way of the file or moved against the saw for measuring a tooth, as may be required. B is a standard attached to the base-piece $a$, and provided with the rod F, which is clamped in any desired position by the screw $j$, and upon which the graduated arc-shaped bar $k$ is mounted. The radius of the arc-bar $k$ is the distance between the standards A and B. E is a movable guide for the rod D, which may be clamped in any required position on the arc-shaped bar $k$ by means of the thumb-screw $l$. The rod D is provided with a ball that is embraced by a socket, $m$, attached to the end of the file-handle G. The file $n$, carried by the handle G, may be moved back and forth across the teeth of the saw H, and, being guided by the rod D, the file is made to cut all of the teeth at precisely the same angle. The saw is reversed on the standard A by loosening the screws $g$ and moving the spring $d$ downward until it will clear the saw, and removing the gage $h$ and swinging it into a vertical position on the opposite side of the standard, when the gage $h$ is replaced, and the spring $d$ again brought up, so as to clamp the saw against the lug $c'$.

By this arrangement the necessity of unscrewing the nut C to change the position of the saw is obviated.

Having thus described my invention, I claim as new and desire to secure by Letters Patent—

1. The combination of the standard A, having the slot $f$ and lugs $c\,c'$, the hinged bolt C, and the spring $d$, having the screws $g$, substantially as herein shown and described.

2. The arc-shaped bar K, and the guide E, carrying the reciprocating file-rod $d$, and provided with clamp-screw $l$, and combined substantially as shown and described, whereby said guide is adapted to slide on and be clamped to the arc-bar in any adjustment, as specified.

ARBA MARTIN.

Witnesses:
J. H. PALMER,
W. D. OSBURN.